No. 757,036. PATENTED APR. 12, 1904.
J. J. GRIFFIN.
PROCESS OF PRODUCING CHEMICAL COMPOUNDS.
APPLICATION FILED JAN. 16, 1902. RENEWED SEPT. 3, 1902.
NO MODEL.
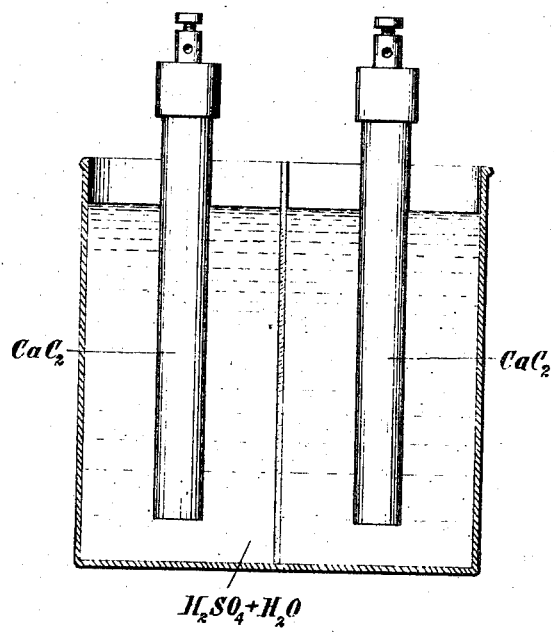
WITNESSES:
INVENTOR
BY
Attorneys No. 757,036. Patented April 12, 1904.

UNITED STATES PATENT OFFICE.

JOHN J. GRIFFIN, OF WASHINGTON, DISTRICT OF COLUMBIA.

PROCESS OF PRODUCING CHEMICAL COMPOUNDS.

SPECIFICATION forming part of Letters Patent No. 757,036, dated April 12, 1904.

Application filed January 16, 1902. Renewed September 3, 1902. Serial No. 122,010. (No specimens.)

*To all whom it may concern:*

Be it known that I, JOHN J. GRIFFIN, a citizen of the United States, residing at Washington, District of Columbia, have invented new and useful Improvements in Processes of Producing Chemical Compounds, of which the following is a specification.

The chemical activity of certain metallic carbids is well known. For example, the carbids of the alkali metals, lithium, sodium, and potassium, react on water at ordinary temperatures, yielding acetylene. Carbids of the alkaline-earth metals, calcium, strontium, and barium, also react on water to give acetylene. Carbids of magnesium, aluminium, and glucinum react on water to give methane. Carbid of manganese reacts on water to give methane and hydrogen. Carbids of cerium, lanthanum, thorium, and yttrium react on water to give acetylene, methane, and ethylene.

The specified carbids have a physical property which, so far as I am aware, has not been practically utilized—that is, they are electrical conductors of the first class—in other words, conduct like metals without undergoing electrolysis. I take advantage of this property by utilizing these carbids as electrodes with any desired electrolyte, whether organic or inorganic, in solutions of normal temperature or as a fused bath and in an electrolytic cell with or without diaphragm, according to the desired product.

The electrolyte employed may be an aqueous or other solution or other liquid capable of chemically reacting on the carbid. For the purposes of my invention the electrolyte must be capable of yielding an electrolytic product which will react either on the electrolyte, solvent, one or both electrodes, or on the product resulting from the direct chemical reaction of the electrolyte on the carbid. Such electrolytic product may be one or both ions, any element or compound resulting from the union of one or both ions, not including the electrolyte, or any secondary product, such as may result from the action of one or both ions on the electrolyte, solvent, or one or both electrodes. The product of the direct chemical reaction may be any gaseous, liquid, or solid element or compound, but, as stated above, is usually a gas.

The electrolysis of an aqueous solution of sulfuric acid with electrodes of calcium carbid will serve as a concrete illustration of the invention.

The accompanying drawing is a transverse vertical section of a diaphragm-cell for carrying out the process under these conditions.

The reactions in this case are as follows: The water of the solution reacts on both electrodes to give acetylene. At the cathode two atoms of hydrogen react on one molecule of acetylene to give ethylene, and four atoms of hydrogen react on one molecule of acetylene to give ethane. The ethylene so produced further reacts on the sulfuric acid in solution to give ethyl sulfuric acid. At the anode two atoms of oxygen react on one molecule of acetylene to give glyoxal, and four atoms of oxygen react on one molecule of acetylene to give oxalic acid.

While the various reactions and resulting compounds which may be produced by this process are too numerous to be enumerated in this specification, the following will give a further view of the scope of the invention.

*1. Inorganic Solutions.*

Alkaline hyposulfites: ethylene at cathode and thio-glyoxal and other sulfur compounds at anode.

Nitric acid and nitrates: ethylene at cathode and cyanic acid and various nitric compounds at anode.

Alkaline nitrites and hyponitrites: ethylene and ethane at cathode and cyanic acid and nitro compounds at anode.

Hydrochloric, hydrobromic, and hydriodic acids and their salts: ethane, ethylene, and di-iodo-ethane at the cathode and various halogen addition products of acetylene at the anode.

Potassium and sodium hydroxids: ethylene and ethane at the cathode and glyoxal at the anode.

Ammonium hydroxid: alkyl substituted ammonias and cyanids at the cathode and cyanids at the anode.

*2. Organic Solutions. Various Addition Products of Acetylene.*

Acetic acid and its metallic salts: ethane and ethylene at the cathode and dimethyl-ethylene and tetramethyl-ethane at the anode.

Prop..nic acid and salts: ethylene and ethane at the cathode and ethyl addition products of acetylene at the anode.

Higher homologues of the fatty-acid series will give ethylene and ethane at the cathode and the corresponding alkyl addition products of acetylene at the anode.

Salts of aromatic acids will give ethylene and ethane at the cathode and aromatic addition products of acetylene at the anode.

Anilin and other aromatic bases and their salts will give amido and amino substituted ethanes at the cathode and acetylene addition products, corresponding to the anion of the salt used, at the anode.

For the production of certain compounds an insoluble substance in a state of fine subdivision may be maintained in suspension in the electrolyte and enter into reaction with the electrochemical product.

I claim—

1. The process of producing chemical compounds, which consists in passing an electric current from an anode of a carbid through an electrolyte which reacts chemically on said carbid and which yields an electrolytic product which will react on the product of said chemical reaction to give the desired compound, as set forth.

2. The process of producing chemical compounds, which consists in passing an electric current from an anode of calcium carbid through an electrolyte which reacts chemically on calcium carbid and which yields an electrolytic product which will react on the product of said chemical reaction to give the desired compound, as set forth.

3. The process of producing chemical compounds, which consists in passing an electric current to a cathode of a carbid, through an electrolyte which yields an electrolytic product which will react on said carbid, as set forth.

4. The process of producing chemical compounds, which consists in passing an electric current to a cathode of calcium carbid, through an electrolyte which yields an electrolytic product which will react on calcium carbid, as set forth.

5. The process of producing chemical compounds, which consists in passing an electric current to a cathode of a carbid, through an electrolyte which reacts chemically on said carbid and which yields an electrolytic product which will react on the product of said chemical reaction to give the desired compound, as set forth.

6. The process of producing chemical compounds, which consists in passing an electric current to a cathode of calcium carbid, through an electrolyte which reacts chemically on calcium carbid and which yields an electrolytic product which will react on the product of said chemical reaction to give the desired compound, as set forth.

7. The process of producing chemical compounds, which consists in passing an electric current between electrodes each of which consists of a carbid, and through an electrolyte which is chemically active toward said carbid, as set forth.

8. The process of producing chemical compounds, which consists in passing an electric current between electrodes each of which consists of a carbid, and through an electrolyte which is electrochemically active toward said carbid, as set forth.

9. The process of producing chemical compounds, which consists in passing an electric current between electrodes each of which consists of a carbid, and one of calcium carbid, and through an electrolyte which is chemically active toward calcium carbid, as set forth.

10. The process of producing chemical compounds, which consists in passing an electric current between electrodes each of which consists of a carbid, and one of calcium carbid, and through an electrolyte which is electrochemically active toward calcium carbid, as set forth.

11. The process of producing chemical compounds, which consists in passing an electric current between electrodes each of which consists of calcium carbid, and through an electrolyte which is chemically active toward calcium carbid, as set forth.

12. The process of producing chemical compounds, which consists in passing an electric current between electrodes each of which consists of calcium carbid, and through an electrolyte which is electrochemically active toward calcium carbid, as set forth.

13. The process of producing chemical compounds, which consists in passing an electric current through an aqueous solution of sulfuric acid to a cathode of calcium carbid, as set forth.

14. The process of producing chemical compounds, which consists in passing an electric current from an anode of calcium carbid through an aqueous solution of sulfuric acid, as set forth.

15. The process of producing chemical compounds, which consists in passing an electric current from an anode of calcium carbid through an aqueous solution of sulfuric acid to a cathode of calcium carbid, as set forth.

16. The process of producing chemical compounds, which consists in passing an electric current between electrodes, one of which consists of a carbid, and through an electrolyte which is electrochemically active toward said carbid, and maintaining in suspension in said electrolyte an insoluble substance capable of entering into reaction with the electrochemical product, as set forth.

In testimony whereof I affix my signature in presence of two witnesses.

JOHN J. GRIFFIN.

Witnesses:
 EUGENE A. BYRNES,
 CHAPMAN W. FOWLER.